UNITED STATES PATENT OFFICE.

HUGO GERIKE, OF BERLIN, PRUSSIA, GERMANY.

IMPROVEMENT IN ANNEALING GLASS AND GLASSWARE.

Specification forming part of Letters Patent No. 202,809, dated April 23, 1878; application filed February 14, 1878.

*To all whom it may concern:*

Be it known that I, HUGO GERIKE, of the city of Berlin, in the Kingdom of Prussia and German Empire, have invented a new and valuable Method or Process for Annealing Glass and Glassware; and I do hereby declare that the following is a full, clear, and exact description of the same.

My invention relates to a new process for annealing glass and glassware; and consists, essentially, in annealing such in a variable temperature according to the varying thicknesses of the parts or body of the object to be annealed, in order that such annealing may be effected uniformly over the surfaces of said object.

The methods heretofore employed are twofold. The first and oldest of these, and the one yet almost generally adopted, consists in transferring the hot glass or glassware as quickly as possible into the annealing box, oven, arch, or leer, according to the nature of the ware, where the temperature has been raised to 800° or 900°, more or less, according to the nature of the articles, which are there allowed to gradually cool. This method, however, has two great defects. In the first place it is impossible to exclude from the leer, or arch, or oven all currents of atmospheric air which chill and harden the surfaces of the glass with which they come in contact; secondly, the cooling is not effected uniformly in articles composed of parts of varying thickness, such as are in universal use, from the fact that the thinner parts will have sufficiently cooled to be removed from the leer, while the inner portion of the thicker parts is as yet not annealed, causing chilled parts, which cannot withstand sudden changes of extremes in temperature, such as they are subjected to in daily use. Besides these drawbacks and defects, the process of annealing is too slow, and tends to impair the required strength or tenacity the glass or ware should have.

The more modern and second method above alluded to consists in immersing or plunging the glass or glassware into a bath, the temperature of which is at the boiling-point, whether this bath consists of oil or water, or either, in combination with chemicals, the reverse takes place in the annealing of that above described, in one sense, at least. Here the cooling is effected too rapidly; hence the glass or glassware is more or less chilled and brittle, while the same defect of non-uniform cooling of such ware as is composed of parts varying in thickness takes place.

It will, therefore, be seen that the essentials to a perfect annealing process consist, first, in the absolute exclusion from the body to be annealed of all atmospheric air; secondly, if the body is of varying thickness the heat should be correspondingly varied—that is to say, the thicker the part the slower it should be made to give up its heat, by surrounding it with a higher temperature than that surrounding the other parts, or by surrounding it with a body containing a greater amount of heat than that contained in the body surrounding the thinner portions, proportionally; and, lastly, in providing a mean time of cooling, neither so slow as the first process described, nor so rapid as the second.

In the process of annealing steam has also been applied in some instances, but with still less satisfactory results than those obtained by the above-described methods.

To remedy these defects, and provide a method of annealing as near perfect as is possible, and embodying the above essentials, is the object of this invention; and I have so far succeeded as to produce a uniformly stronger glass or glassware, capable of resisting not only sudden changes of extreme temperatures, but also comparatively severe shocks or falls from comparatively great distances, and of consequent better quality than the best annealed glass or glassware now produced.

The means employed for carrying this process into effect may be considerably varied, and naturally must be, owing to the variable nature of the objects to be annealed, and the description of some of the principal features of those means will be necessary only in order that those skilled in the art may fully understand them and be able to carry out the process effectually.

The articles to be annealed are, as is usual, taken directly from the blow-pipe or mold in a hot state; but instead of placing them on trays to be carried into the annealing arches or leers, I place them as quickly as possible upon heated metallic plates, placed ready for their reception, and cover each separate article as soon as placed upon the plate, with thin metallic forms or molds open at the lower end only, in order to exclude all atmospheric air.

The shape of the base-plate corresponds to that of the article to be annealed. If this is flat the base-plate will be flat also. When glasses, bottles, or similar articles having thick bases are to be annealed, the base-plate should be correspondingly thick, and should, further, be provided with a projecting rim or band, to obviate or avoid the too rapid cooling of the periphery or outer part of this thick portion of the glass. In a similar manner, when glasses provided with handles are to be annealed, the base-plate should be increased in thickness at that point where the handle rests thereon, to prevent their too rapid cooling.

Both the base or bed plates and the forms or coverings may be of any suitable material, though good conductors of heat, like metal, are preferable, owing to the fact that if glass loses from 300° to 400° of heat very rapidly when not in contact with atmospheric air it becomes tougher, and its qualities of resistance are greatly enhanced.

It is also evident that, from what has been said above, the rapidity of cooling must have certain limits if good results are to be obtained, and for this reason I increase the sectional diameter of the metallic plates according to the increase of the thickness of the glass with which such plates are in contact.

From experience I have found that base-plates of $0.^{m}01^{cm}$ thick, and provided with a rim of $0.^{m}006^{mm}$ thick, answer all the purposes for annealing glassware of almost every description, and from which the limit of cooling may be readily deduced for all other articles, notwithstanding that these dimensions vary according to circumstances, and are, according to above principles, increased or diminished.

The forms or molds are made of thin sheet iron, and, when employed for annealing bottles having an annular re-enforce at the mouth, I prefer to add an annular heated ring or cap, placed over the form to be in the same position as the re-enforce. In one word, I apply additional sections of heated metal to the thicker portions of the articles to be annealed, the increase in this thickness of metal being always corresponding to that of the article to be annealed, to avoid the variable annealing of the object.

The heated plates are placed upon a table, or a plate serving as such, in close proximity to where the article is blown or molded.

The height of the rim upon the base-plate should be such as to cover the thicker portion of the base of the article to be annealed; and the interior diameter of this flange or rim, as well as that of the heated metallic covering, should be such as to permit of the article being placed therein and covered up without coming in contact with either.

The articles may be removed as soon as cool enough to handle, and, when placed in an air-tight chest, they may be removed while yet quite hot.

Having described my invention, what I claim is—

1. The process or method of annealing glass, consisting in annealing the same in an initial temperature proportionally graduated to the thickness of such glass, and allowing it to cool therein gradually, substantially as described, for the purpose specified.

2. In the process or method of annealing glass, consisting in annealing the same in a temperature proportionally graduated to the thickness of the glass, and shielding it from contact with the outer surrounding atmosphere, substantially as described, for the purpose specified.

3. In the process of annealing glass, shielding the same from contact with atmospheric air by transfering each article direct from the blow-pipe or mold into a previously-heated and practically air-tight receptacle, so constructed that the article to be annealed will not come in contact with the walls of said receptacle, substantially as described, for the purpose specified.

4. In the process or method of annealing glass, graduating the initial temperature proportionally with that of the thickness or varying thicknesses of the glass by inclosing each article in a practically air-tight and previously-heated receptacle, whose walls conform to or nearly conform to the thickness or varying thicknesses of the article therein contained, and allowing such article to cool gradually, substantially as described, for the purpose specified.

5. In the process of annealing glass, graduating the initial temperature proportionally with that of the thickness or varying thicknesses of the glass by inclosing each article in a practically air-tight and previously-heated receptacle, whose walls conform not only proportionally to the thickness of the contained article, but also to its shape or configuration, or nearly so, to form a matrix in which the article is annealed, substantially as described, for the purpose specified.

6. In the process of annealing glass, consisting in taking each separate article direct from the blow-pipe or the mold and shielding it from contact with the surrounding atmosphere by rapidly inclosing it, while yet very hot, in a practically air-tight and previously-heated form or matrix, in configuration like, or nearly like, that of the object to be annealed, and whose walls are proportionate in thickness to that or the varying thickness of the object, to provide a variable temperature, as set forth, and allowing said object to gradually cool in and with the matrix, as described, for the purpose specified.

In witness whereof I have hereunto signed my name in the presence of two subscribing witnesses.

HUGO GERIKE.

Witnesses:
   BERTHOLD ROI,
   ROBERT GOTTHEIL.